(12) United States Patent
Han et al.

(10) Patent No.: US 11,329,287 B2
(45) Date of Patent: May 10, 2022

(54) CATHODE ADDITIVE, PREPARATION METHOD THEREOF, AND CATHODE AND LITHIUM SECONDARY BATTERY COMPRISING THE SAME

(71) Applicant: LG Chem, Ltd., Seoul (KR)

(72) Inventors: Jungmin Han, Daejeon (KR); Byungchun Park, Daejeon (KR); Ji Hye Kim, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 168 days.

(21) Appl. No.: 16/605,755

(22) PCT Filed: Nov. 15, 2018

(86) PCT No.: PCT/KR2018/014016
§ 371 (c)(1),
(2) Date: Oct. 16, 2019

(87) PCT Pub. No.: WO2019/107808
PCT Pub. Date: Jun. 6, 2019

(65) Prior Publication Data
US 2020/0335790 A1    Oct. 22, 2020

(30) Foreign Application Priority Data

Nov. 30, 2017 (KR) .......................... 10-2017-0163112
Aug. 6, 2018 (KR) .......................... 10-2018-0091425

(51) Int. Cl.
*H01M 4/62* (2006.01)
*H01B 1/08* (2006.01)
(Continued)

(52) U.S. Cl.
CPC .............. *H01M 4/62* (2013.01); *C01G 53/42* (2013.01); *H01B 1/08* (2013.01); *H01M 4/131* (2013.01);
(Continued)

(58) Field of Classification Search
CPC .. H01B 1/00; H01B 1/08; H01B 1/20; H01M 4/131; H01M 4/505; H01M 4/525; H01M 4/666
See application file for complete search history.

(56) References Cited

U.S. PATENT DOCUMENTS 5,393,622 A * 2/1995 Nitta ....................... C01G 53/42
429/223
5,955,219 A * 9/1999 Nishijima .............. C01G 53/42
429/220
(Continued)

FOREIGN PATENT DOCUMENTS

CN       101359736 A    2/2009
CN       101847722 A    9/2010
(Continued)

OTHER PUBLICATIONS

English language translation of PCT form ISA/237 (mailed Mar. 11, 2019).*
(Continued)

*Primary Examiner* — Mark Kopec
(74) *Attorney, Agent, or Firm* — Lerner, David, Littenberg, Krumholz & Mentlik, LLP

(57) ABSTRACT

The present invention relates to a cathode additive, a method for preparing the same, and a cathode and a lithium secondary battery including the same. More specifically, one embodiment of the present invention provides a cathode additive that can offset an irreversible capacity imbalance,
(Continued)

increase the initial charge capacity of a cathode, and simultaneously inhibit the generation of gas in a battery.

15 Claims, 6 Drawing Sheets

(51) Int. Cl.

| | | |
|---|---|---|
| *C01G 53/00* | (2006.01) | |
| *H01M 4/131* | (2010.01) | |
| *H01M 4/505* | (2010.01) | |
| *H01M 4/525* | (2010.01) | |
| *H01M 10/0525* | (2010.01) | |
| *H01M 4/02* | (2006.01) | |

(52) U.S. Cl.
CPC ........... *H01M 4/505* (2013.01); *H01M 4/525* (2013.01); *H01M 10/0525* (2013.01); *C01P 2002/50* (2013.01); *C01P 2002/72* (2013.01); *C01P 2004/84* (2013.01); *C01P 2006/40* (2013.01); *H01M 2004/028* (2013.01)

(56) References Cited

U.S. PATENT DOCUMENTS

| | | |
|---|---|---|
| 6,207,325 B1 | 3/2001 | Matsui et al. |
| 6,875,416 B1 * | 4/2005 | Benz ............... C01G 53/44 423/594.15 |
| 7,666,551 B2 | 2/2010 | Kogetsu et al. |
| 2004/0076882 A1 | 4/2004 | Hosoya et al. |
| 2005/0118496 A1 | 6/2005 | Chang et al. |
| 2006/0292446 A1 | 12/2006 | Kweon et al. |
| 2010/0203386 A1 | 8/2010 | Chang et al. |
| 2010/0216030 A1 | 8/2010 | Maeda |
| 2010/0227221 A1 | 9/2010 | Chang et al. |
| 2011/0151327 A1 | 6/2011 | Imanari |
| 2012/0003541 A1 | 1/2012 | Song et al. |
| 2012/0164533 A1 | 6/2012 | Senoue et al. |
| 2013/0247363 A1 | 9/2013 | Nelson et al. |
| 2014/0193714 A1 | 7/2014 | Kim et al. |
| 2015/0132651 A1 | 5/2015 | Lee et al. |
| 2016/0133933 A1 | 5/2016 | Choi et al. |
| 2016/0218359 A1 | 7/2016 | Kim et al. |
| 2016/0365566 A1 | 12/2016 | Cui et al. |
| 2020/0266447 A1 * | 8/2020 | Kim ................. H01M 4/505 |
| 2021/0083290 A1 * | 3/2021 | Kim ................. H01M 4/131 |

FOREIGN PATENT DOCUMENTS

| | | |
|---|---|---|
| CN | 102315441 A | 1/2012 |
| CN | 103915610 A | 7/2014 |
| CN | 105247715 A | 1/2016 |
| JP | 2005317277 A | 11/2005 |
| JP | 2012142156 A | 7/2012 |
| KR | 20060008568 A | 1/2006 |
| KR | 100656648 B1 | 12/2006 |
| KR | 20070082900 A | 8/2007 |
| KR | 101064729 B1 | 9/2011 |
| KR | 101397022 B1 | 5/2014 |
| KR | 20140058165 A | 5/2014 |
| KR | 20150079362 A | 7/2015 |
| KR | 20160090580 A | 8/2016 |
| KR | 101746187 B1 | 6/2017 |
| WO | 2005031892 A2 | 4/2005 |

OTHER PUBLICATIONS

International Search Report for Application No. PCT/KR2018/014016, dated Mar. 11, 2019, pp. 1-2.

Kim et al., Air stable Al2O3-coated Li2NiO2 cathode additive as a surplus current consumer in a Li-ion cell, Journal of Materials Chemistry, Published Nov. 2008, pp. 5880-5887, vol. 18, The Royal Society of Chemistry.

Chinese Search Report for Application No. 201880017875.9 dated Jan. 20, 2022, 4 pages.

* cited by examiner

【FIG. 1】
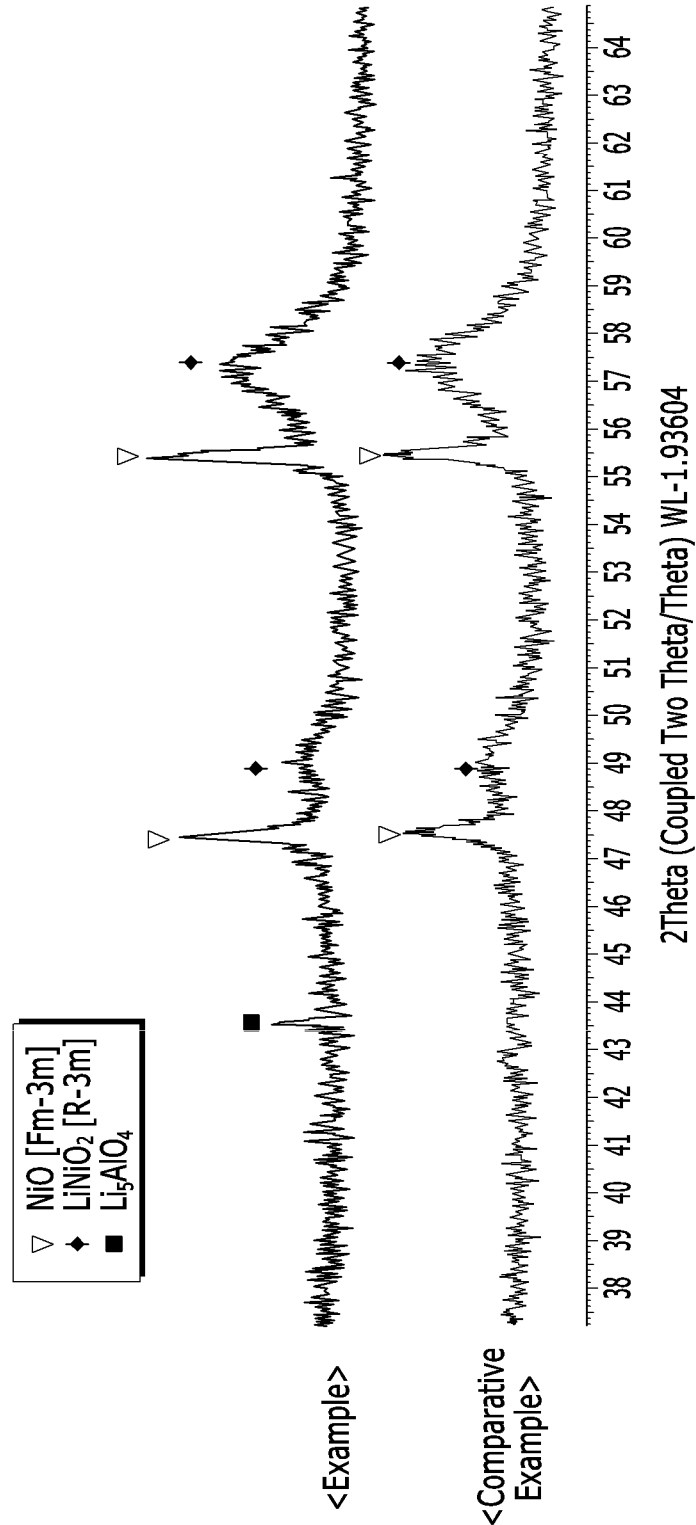

[FIG. 2a]
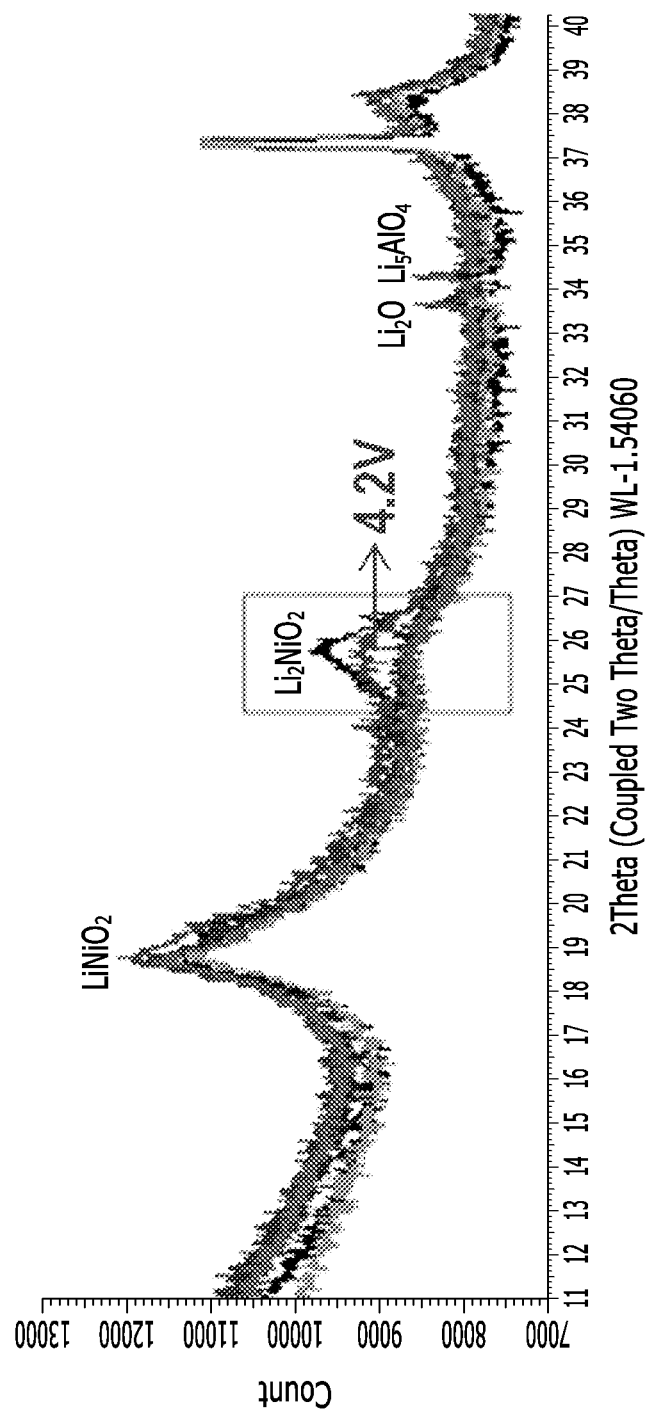

[FIG. 2b]
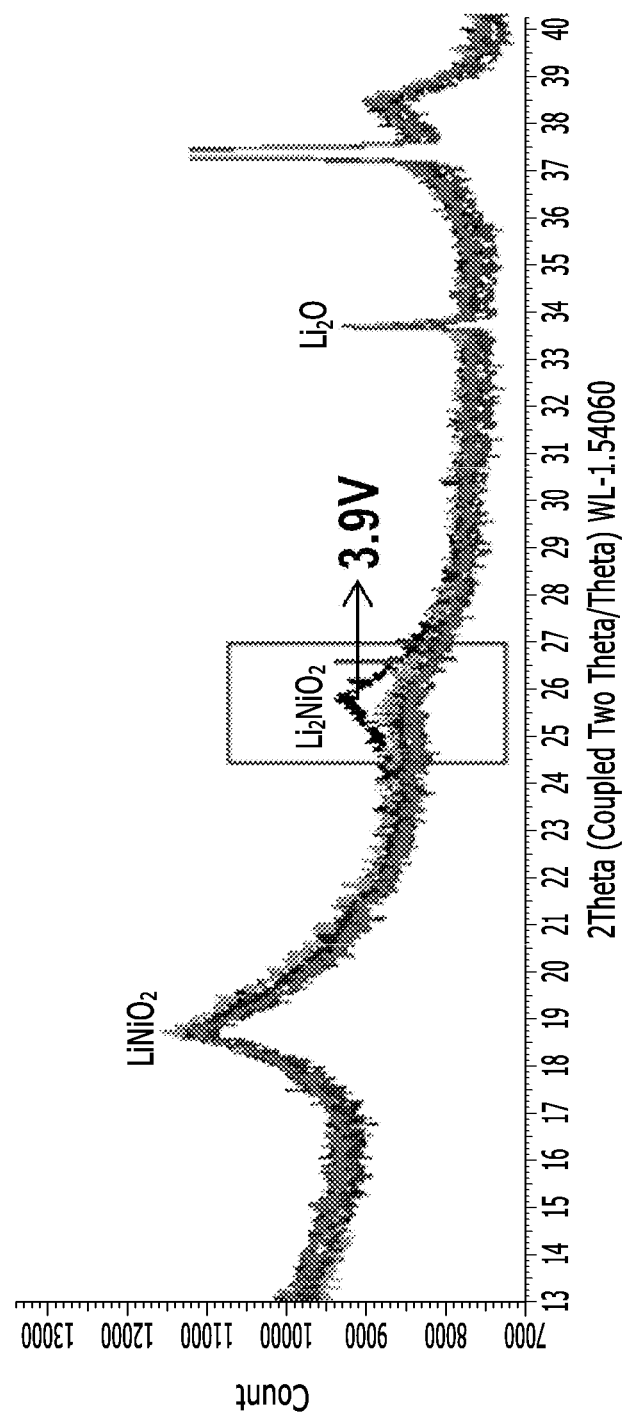

【FIG. 3】
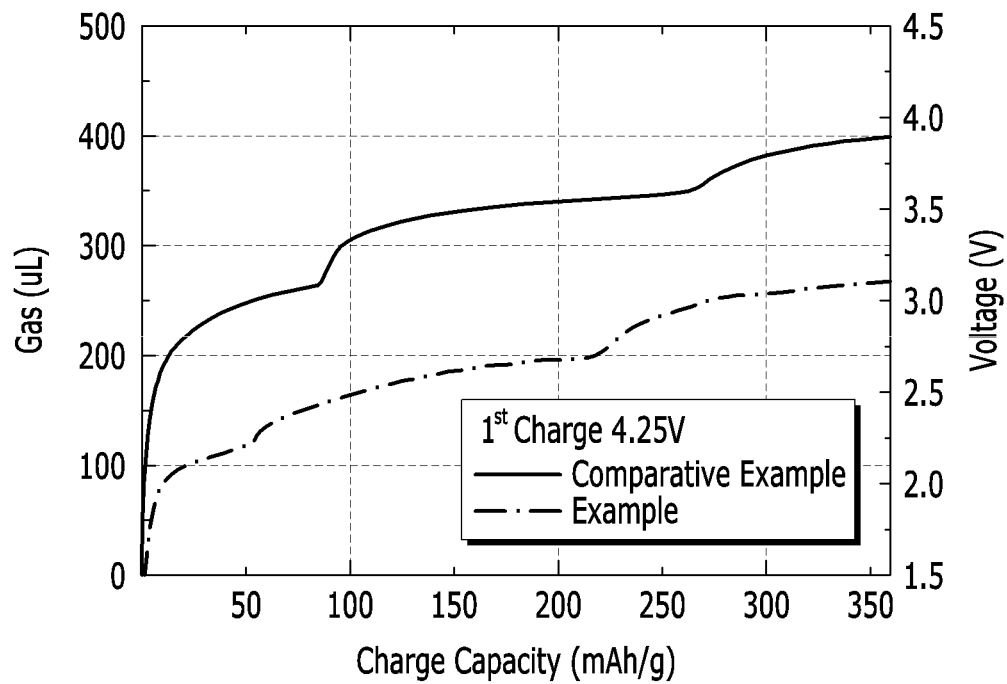

[FIG. 4]
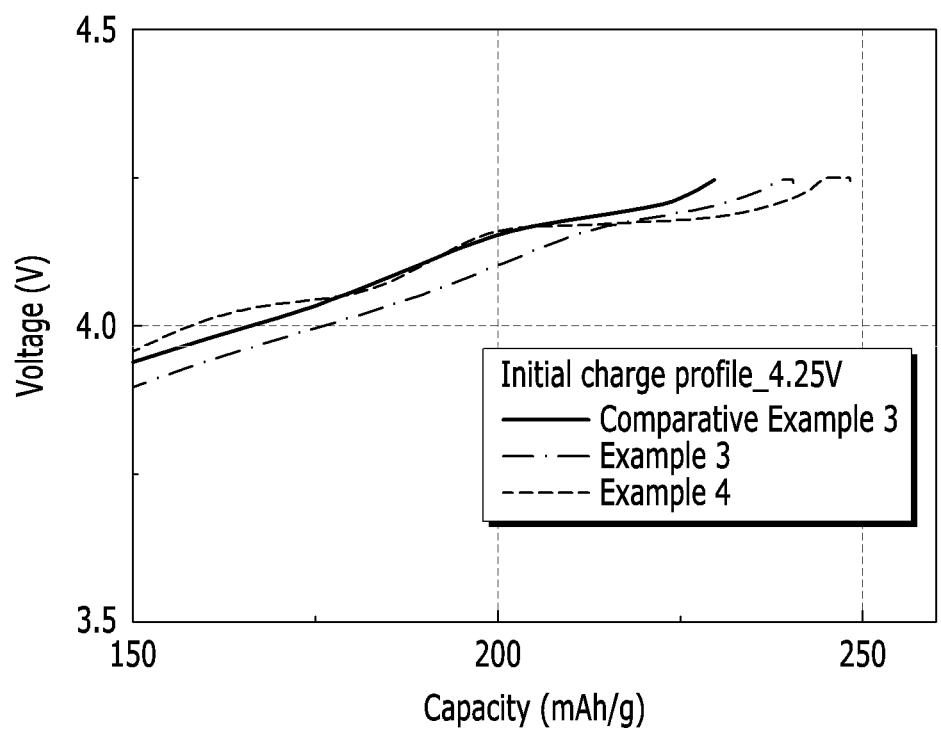

CATHODE ADDITIVE, PREPARATION METHOD THEREOF, AND CATHODE AND LITHIUM SECONDARY BATTERY COMPRISING THE SAME

CROSS-REFERENCE TO RELATED APPLICATION

The present application is a national phase entry under 35 U.S.C. § 371 of International Application No. PCT/KR2018/014016 filed Nov. 15, 2018, the disclosure of which is incorporated herein in its entirety by reference, which claims priority from and the benefit of Korean Patent Application No. 10-2017-0163112 filed on Nov. 30, 2017 and Korean Patent Application No. 10-2018-0091425 filed on Aug. 6, 2018 with the Korean Intellectual Property Office, the disclosures of which are herein incorporated by reference in their entirety.

TECHNICAL FIELD

The present invention relates to a cathode additive, a method for preparing the same, and a cathode and a lithium secondary battery including the same.

BACKGROUND ART

A lithium secondary battery uses electrode active materials capable of reversible intercalation and deintercalation of lithium ions, in an anode and a cathode, realizes the transfer of lithium ions by an electrolyte, and produces electrical energy by the oxidation and reduction reactions in each electrode.

However, during the $1^{st}$ cycle charge-discharge of a lithium secondary battery, lithium ions that are intercalated in an anode (battery charge) and then deintercalated (battery discharge), and lithium ions that are deintercalated from a cathode (battery charge) and then cannot be recovered again (battery discharge), are necessarily generated. This is related to the irreversible capacity of both electrodes.

As the irreversible capacity difference of the electrodes is large, the initial efficiency of a cathode decreases, and the energy density gradually deceases during the operation of a battery, and thus the cycle life of a battery may decrease.

DISCLOSURE

Technical Problem

One embodiment of the present invention provides a cathode additive that can offset an irreversible capacity imbalance, increase the initial charge capacity of a cathode, and simultaneously inhibit the generation of gas in a battery.

Technical Solution

The advantages and characteristics of the embodiments of the present invention, and methods for achieving the same, will be clarified referring to the examples described below. However, the present invention is not limited by the examples disclosed below and can be realized in various forms. Further, the examples are presented only for better understanding of the invention by a person having ordinary knowledge in the art, and the present invention is defined only by the claims.

Hereinafter, unless otherwise defined, the technical terms and scientific terms used herein have meanings which a person having ordinary knowledge commonly understands. In addition, repeated explanations of the technical constructions and actions identical to those of the prior art will be omitted.

Throughout the specification, when a part is "connected" with another part, it not only includes the case wherein they are "directly connected", but also includes the case wherein they are "electrically connected" with another device therebetween.

Throughout the specification, when a member is positioned "on" another member, it not only includes the case wherein a member contacts another member, but also includes a case wherein still another member exists between the two members.

Throughout the specification, when a part "comprises" a constructional element, unless described to the contrary, other constructional elements are not excluded, and other constructional elements can be further included.

Terms indicating a degree such as "about", "substantially", and the like used throughout the specification, when a tolerance of preparation and material unique to the mentioned meaning is presented, are used as a meaning close to the numerical value, and are used to prevent the disclosure from mentioning an exact or absolute numerical value for understanding of the invention being unreasonably used by an unprincipled infringer.

Throughout the specification, the term "~step" or "step of~" does not mean a "step for~".

Throughout the specification, the term "combination(s) thereof" included in the expression of a Markush type means mixtures or combinations of one or more selected from the group consisting of the constructional elements described in the expression of a Markush type, and means to include one or more selected from the group consisting of the constructional elements.

Throughout the specification, the description "A and/or B" means "A or B, or A and B".

Cathode Additive

One embodiment of the present invention provides a cathode additive of which the composition is represented by the following Chemical Formula 1:

$$\{_x(Li_{2+a}Ni_bM_{1-b}O_{2+c})\}\cdot\{_y(NiO)\}\cdot\{_z(Li_2O)\}\cdot\{_wLi_5MO_4\} \quad \text{[Chemical Formula 1]}$$

wherein, in Chemical Formula 1, M is one or more metal atoms forming a divalent cation or a trivalent cation, $-0.2 \leq a \leq 0.2$, $0.5 \leq b \leq 1.0$, $-0.2 \leq c \leq 0.2$, $0.6 \leq x \leq 1.0$, $0 < y \leq 0.15$, $0 < z \leq 0.15$, $0 \leq w \leq 0.1$, and $x+y+z+w=1$.

Further, in one embodiment, $b=1.0$, $0<w\leq0.1$, and when $w=0$, $0.5\leq b\leq1.0$. This means that in case M doping is not included ($b=1.0$) in Chemical Formula 1, a compound including M ($Li_5MO_4$) necessarily exists ($0<w\leq0.1$), and to the contrary, in case a compound including M ($Li_5MO_4$) is not included ($w=0$) in Chemical Formula 1, M doping is necessary ($0.5\leq b\leq 1.0$) in Chemical Formula 1. Both M doping and a compound including M ($Li_5MO_4$) may exist in Chemical Formula 1, thus simultaneously fulfilling $0.5\leq b<1.0$ and $0<w\leq0.1$.

Grounds for Derivation of Chemical Formula 1

In one embodiment, theoretically, when mixing a nickel-based oxide (($Ni_dM_{1-d}$)$O_x$ (wherein M is as defined in Chemical Formula 1, and $0.5\leq d\leq1.0$) and lithium oxide ($Li_2O$) at a stoichiometric mole ratio of 1:1 and heat treating the mixture, the total amount mixed may react at a mole ratio of 1:1 to form a lithium nickel oxide represented by the following Chemical Formula 1-1, and non-reacted raw materials may not remain.

$$Li_{2+a}Ni_bM_{1-b}O_{2+c} \quad \text{[Chemical Formula 1-1]}$$

(In Chemical Formula 1-1, a, b, c, and M are as defined in Chemical Formula 1.)

The lithium nickel oxide represented by Chemical Formula 1-1 may irreversibly discharge lithium ions and oxygen at the initial charge voltage of a battery, for example, 2.5 to 4.25 V (vs. Li/Li+), offset an irreversible capacity imbalance of the two electrodes, and increase the initial charge capacity of a cathode.

However, in a practical process, even if a nickel-based oxide $((Ni_dM_{1-d})O_x)$ and lithium oxide $(Li_2O)$ are mixed at a mole ratio of 1:1 and heat-treated, the total amount mixed may not react at a mole ratio of 1:1, and non-reacted raw materials may necessarily remain. In the studies known so far, non-reacted raw materials were handled as simple impurities and removed, and only a material having a theoretical composition (namely, the lithium nickel oxide represented by Chemical Formula 1-1) was recovered and used as a cathode additive.

As such, in the present study, unlike the studies known so far, it was found that when non-reacted raw materials are not removed after the reaction of a nickel-based oxide $((Ni_dM_{1-d})O_x)$ and lithium oxide $(Li_2O)$, but are recovered together with a material having a theoretical composition (namely, the lithium nickel oxide represented by Chemical Formula 1-1), the initial charge capacity of a cathode can be further increased, which was unexpected and to the contrary of the then-current understanding in the art. [NOTE—IS THIS A CORRECT STATEMENT?]

Specifically, due to the existence of non-reacted raw materials, particularly lithium oxide $(Li_2O)$, in addition to a lithium nickel oxide represented by Chemical Formula 1-1, extra Li can be provided for a cathode, thereby further increasing the initial charge capacity of a cathode.

In addition, in the present study, it was recognized that the reaction product of a nickel-based oxide $((Ni_dM_{1-d})O_x)$ and lithium oxide $(Li_2O)$, namely, the lithium nickel oxide represented by Chemical Formula 1-1, is structurally unstable and has high reactivity.

Specifically, simultaneously while the lithium nickel oxide represented by Chemical Formula 1-1 irreversibly discharges lithium ions and oxygen at the initial charge voltage of a battery, the internal crystal structure is collapsed, and side-reactions with an electrolyte progress on the surface, thus generating a gas that may inhibit battery performance. In such cases where a gas is generated in a battery, the initial capacity of a battery, the initial charge/discharge efficiency, etc., may be decreased.

Thus, in the present study, a specific metal (M) is doped in the crystal structure of the lithium nickel oxide represented by Chemical Formula 1-1, or a compound of a specific metal (M) is coated on the surface thereof, which may stabilize the crystal structure and decrease or altogether inhibit gas generation. [NOTE—IS THIS ACCURATE?] The whole composition of the cathode additive obtained may be represented by the above-explained Chemical Formula 1-1. [SHOULD THIS BE FORMULA 1?]

Hereinafter, a cathode additive of one embodiment derived from the present study will be explained in detail Al Doping and/or Coating The cathode additive of one embodiment may be prepared by mixing aluminum oxide $(Al_2O_3)$ together with a nickel-based oxide $((Ni_dM_{1-d})O_x)$ and lithium oxide $(Li_2O)$, and then heat treating the mixture. Specifically, when mixing the raw materials, the nickel-based oxide and lithium oxide $(Li_2O)$ may be mixed at a stoichiometric mole ratio of 1:1.02 to 1:0.98, and the aluminum oxide $(Al_2O_3)$ may be mixed such that it may be 100 to 10,000 ppm in the total weight of the mixture.

The cathode additive obtained may include doped and/or coated Al. In this case, M of Chemical Formulas 1 and 1-1 may include Al, 0.5≤b<1.0 (doping), and 0<w≤0.1 (coating).

However, as explained above, when b=1.0, 0<w≤0.1, and when w=0, 0.5≤b<1.0. This means that in case M doping is not included (b=1.0) in Chemical Formula 1, a compound including $M(Li_5MO_4)$ necessarily exists (0<w≤0.1), and to the contrary, in cases where a compound including M $(Li_5MO_4)$ is not included (w=0) in Chemical Formula 1, M doping is necessary (0.5≤b<1.0) in Chemical Formula 1. Both M doping and a compound including M $(Li_5MO_4)$ may exist in Chemical Formula 1, thus simultaneously fulfilling 0.5≤b<1.0 and 0<w≤0.1, for example, simultaneously fulfilling 0.7≤b<1.0 and 0<w≤0.05, or simultaneously fulfilling 9≤b<1.0 and 0<w≤0.04.

More specifically, during the heat treatment process, the nickel-based oxide $((Ni_dM_{1-d})O_x)$ and the lithium oxide $(Li_2O)$ react to synthesize lithium nickel oxide represented by Chemical Formula 1-1. Then, Al of the aluminum oxide $(Al_2O_3)$ may be doped in the crystal structure of the lithium nickel oxide represented by Chemical Formula 1-1, and the aluminum oxide $(Al_2O_3)$ may react with lithium oxide $(Li_2O)$ that did not participate in the reaction, to form $Li_5AlO_4$.

The cathode additive obtained may have a core-shell (where Al may be in the coating layer) structure. For example, it may include a core including the lithium nickel oxide represented by Chemical Formula 1-1, nickel oxide (NiO), and lithium oxide $(Li_2O)$; and a coating layer including $Li_5AlO_4$.

Quantitative and Qualitative Analysis

It may be confirmed from XRD (X-Ray Diffraction) analysis results that the lithium nickel oxide represented by Chemical Formula 1-1, nickel oxide (NiO), and lithium oxide $(Li_2O)$ constitute a core, and $Li_5AlO_4$ constitutes a coating layer, in the cathode additive of a core-shell (coating layer) structure.

In the cathode additive of a core-shell (coating layer) structure, $Li_5AlO_4$, the lithium nickel oxide represented by Chemical Formula 1-1, nickel oxide (NiO), and lithium oxide $(Li_2O)$, may be respectively detected as crystalloids, by XRD (X-Ray Diffraction) by Fe Kα X-ray (X-rα).

That is, if the cathode additive is analyzed qualitatively and quantitatively using XRD (X-Ray Diffraction) by Fe Kα X-ray (X-rα), each existence of the $Li_5AlO_4$, the lithium nickel oxide represented by Chemical Formula 1-1, the nickel oxide (NiO), and the lithium oxide $(Li_2O)$, and each amount, may be confirmed.

Specifically, by XRD (X-Ray Diffraction) measurement by Fe Kα X-ray (X-rα), the appearance of a main peak in at least one of a range in which 2θ is 33 to 36°, or in which 2θ is 42 to 45°, may be considered to be due to the $Li_5AlO_4$.

It may appear with the intensity of greater than 0 and equal to or less than 10, greater than 0 and equal to or less than 8, or greater than 0 and equal to or less than 5, when the intensity of the main peak of the lithium nickel oxide represented by Chemical Formula 1-1 (for example, $Li_2NiO_2$) is considered as 100 (Ref.). Thus, it can be seen that the content of $Li_5AlO_4$ in the total amount of the cathode additive (100 wt %) is greater than 0 wt % and equal to or less than 10 wt %, greater than 0 wt % and equal to or less than 8 wt %, or greater than 0 wt % and equal to or less than 5 wt %.

These ranges may be achieved by controlling the content of aluminum oxide (Al$_2$O$_3$) in the total weight of the mixed raw materials to greater than 100 ppm and equal to or less than 10,000 ppm, greater than 100 and equal to or less than 8000 ppm, greater than 100 ppm and equal to or less than 5000 ppm, or greater than 100 ppm and equal to or less than 3000 ppm, when mixing aluminum oxide (Al$_2$O$_3$) together with a nickel-based oxide ((Ni$_d$M$_{1-d}$)O$_x$) and lithium oxide (Li$_2$O). In these ranges, the structural collapse of the lithium nickel oxide represented by Chemical Formula 1-1 may be inhibited, and gas generation may also be inhibited.

Further, by XRD (X-Ray Diffraction) measurement by Fe Kα X-ray (X-rα), the appearance of a main peak in at least one of a range in which 2θ is 30 to 35°, a range in which 2θ is 35 to 40°, or a range in which 2θ is 55 to 60°, may be considered to be due to the lithium oxide (Li$_2$O).

It may appear with the intensity of greater than 0 and equal to or less than 15, greater than 0 and equal to or less than 14, greater than 0 and equal to or less than 13, or greater than 0 and equal to or less than 12, when the intensity of the main peak of the lithium nickel oxide represented by Chemical Formula 1-1 is considered as 100 (Ref.). Thus, it can be seen that the content of lithium oxide (Li$_2$O) in the total amount of the core (100 wt %) is greater than 0 wt % and equal to or less than 15 wt %, greater than 0 wt % and equal to or less than 14 wt %, greater than 0 wt % and equal to or less than 13 wt %, or greater than 0 wt % and equal to or less than 12 wt %.

Further, by XRD (X-Ray Diffraction) measurement by Fe Kα X-ray (X-rα), the appearance of a main peak in at least one of a range in which 2θ is 35 to 40°, a range in which 2θ is 40 to 45°, or a range in which 2θ is 50 to 55° may be considered to be due to the nickel oxide (NiO).

It may appear with the intensity of greater than 0 and equal to or less than 15, greater than 0 and equal to or less than 14, greater than 0 and equal to or less than 13, or greater than 0 and equal to or less than 12, when the intensity of the main peak of the lithium nickel oxide represented by Chemical Formula 1-1 is considered as 100 (Ref.). Thus, it can be seen that the content of nickel oxide (NiO) in the total amount of the core (100 wt %) is greater than 0 wt % and equal to or less than 15 wt %, greater than 0 wt % and equal to or less than 14 wt %, greater than 0 wt % and equal to or less than 13 wt %, or greater than 0 wt % and equal to or less than 12 wt %.

Finally, by XRD (X-Ray Diffraction) measurement by Fe Kα X-ray (X-rα), a main peak may appear in at least one of a range in which 2θ is 18 to 21°, a range in which 2θ is 24 to 27°, or a range in which 2θ is 43 to 46°. Such a main peak may appear by an orthorhombic crystal structure with a point group of 1 mmm, and it may be due to the lithium nickel oxide represented by Chemical Formula 1-1.

The content may be calculated by subtracting the content of the Li$_5$AlO$_4$, the content of the lithium oxide (Li$_2$O), and the content of the nickel oxide (NiO) from the total amount of the cathode additive (100 wt %).

Comprehensively considering the results of the quantitative analysis and the qualitative analysis, it can be seen that Li$_5$AlO$_4$, the lithium nickel oxide represented by Chemical Formula 1-1, nickel oxide (NiO), and lithium oxide (Li$_2$O) are included in the cathode additive, and the whole composition is as shown in Chemical Formula 1. Specifically, in Chemical Formula 1, x, y, and z are respectively related to the weight ratios of the lithium nickel oxide represented by Chemical Formula 1-1, nickel oxide (NiO), and lithium oxide (Li$_2$O).

For example, in Chemical Formula 1, 0.7≤x<1.0, 0<y≤0.15, and 0<z≤0.15; 0.72≤x<1.0, 0<y≤0.14, and 0<z≤0.14; 0.74≤x≤1.0, 0<y≤0.13, and 0<z≤0.13; 0.74≤x<1.0, 0<y≤0.13, and 0<z≤0.13; or 0.76≤x<1.0, 0<y≤0.12, and 0<z≤0.12. Although synergistic effects by each component may be obtained in the above ranges, these ranges are no more than examples, and the present invention is not limited thereby.

Meanwhile, the core may irreversibly discharge lithium ions and oxygen at the initial charge voltage of a battery, for example, 2.5 to 4.25 V (vs. Li/Li+), and thereafter, the whole composition may be converted into the following Chemical Formula 2.

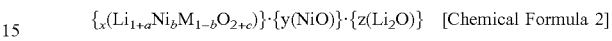
{x(Li$_{1+a}$Ni$_b$M$_{1-b}$O$_{2+c}$)}·{y(NiO)}·{z(Li$_2$O)}    [Chemical Formula 2]

(In Chemical Formula 2, M, a, b, c, x, y, and z are as defined in Chemical Formula 1, respectively.)

In the core converted into Chemical Formula 2, Li$_{2+a}$Ni$_b$M$_{1-b}$O$_{2+c}$ is capable of reversible intercalation/deintercalation of lithium ions, like common cathode active materials. On the surface of the core converted into Chemical Formula 2, the coating layer may still exist.

Thus, the cathode additive of one embodiment may be utilized as additives for compensating the initial irreversible capacity of an anode, and as an active material enabling the reversible intercalation/deintercalation of lithium. However, the core converted into Chemical Formula 2 may have a small reversible capacity compared to common cathode active materials, specifically, a reversible capacity of 300 to 350 mAh/g, due to the Li content and structural limitation. Thus, in case the initial performance of a battery is to be improved simultaneously with securing long term cycle life characteristics, cathode active materials may be combined with the cathode additive of one embodiment at an appropriate mix ratio according to the aimed battery properties.

A Method for Preparing a Cathode Additive

Another embodiment of the present invention provides a method for preparing a cathode additive including steps of: preparing a nickel-based oxide represented by the following Chemical Formula 3; and heat treating a mixture of the nickel-based oxide, lithium oxide (Li$_2$O), and aluminum oxide (Al$_2$O$_3$). By the preparation method, the above-explained cathode additive may be obtained.

(Ni$_d$M$_{1-d}$)O$_x$    [Chemical Formula 3]

In Chemical Formula 3, M is a metal atom forming a divalent cation or a trivalent cation, 0.5≤d≤1.0, and 1.8≤x≤2.2.

In the preparation method of one embodiment, the step of preparing the nickel-based oxide represented by Chemical Formula 3 may be a step of heat treating nickel oxide (Ni(OH)$_2$) alone, or a mixture of nickel oxide (Ni(OH)$_2$) and an M-containing compound.

The heat treatment of nickel oxide (Ni(OH)$_2$) alone, or a mixture of nickel oxide (Ni(OH)$_2$) and an M-containing compound, may be conducted at a temperature range of 500 to 700° C. for 5 to 20 hours.

In this step, in case the nickel oxide (Ni(OH)$_2$) is heat treated alone, the nickel oxide (NiO$_x$) of Chemical Formula 3 wherein d is 0 may be formed. On the contrary, in case the mixture of nickel oxide (Ni(OH)$_2$) and an M-containing compound is heat treated, an M-doped nickel-based oxide ([Ni$_d$M$_{1-d}$]O$_x$) wherein d is not 0 may be formed.

In the preparation method of one embodiment, the step of heat treating a mixture of the nickel-based oxide, lithium oxide (Li$_2$O), and aluminum oxide (Al$_2$O$_3$) may include mixing the nickel-based oxide and the lithium oxide at a mole ratio of 1:1 (±0.02), controlling the content of aluminum oxide ($Al_2O_3$) in the total weight of the raw materials mixed to greater than 100 ppm and equal to or less than 10,000 ppm, and heat treating the mixture at a temperature of 400 to 800° C. for 10 to 20 hours under an inert atmosphere.

When the mixture of the nickel-based oxide and lithium oxide ($Li_2O$) is heat treated, the nickel-based oxide (($Ni_dM_{1-d})O_x$) and the lithium oxide ($Li_2O$) react to synthesize the lithium nickel oxide represented by Chemical Formula 1-1, but the whole amount mixed may not react at a mole ratio of 1:1, and thus non-reacted raw materials may remain.

In addition, Al of the aluminum oxide ($Al_2O_3$) may be doped in the crystal structure of the lithium nickel oxide represented by Chemical Formula 1-1, and the aluminum oxide ($Al_2O_3$) may react with lithium oxide ($Li_2O$) that did not participate in the reaction to form $Li_5AlO_4$.

The whole composition of the product obtained thereby and the effects are as explained above.

Cathode Mixture

Yet another embodiment of the present invention provides a cathode mixture including the above-explained cathode additive, and a cathode active material.

Since the cathode mixture of one embodiment uses the above-explained cathode additive, the initial irreversible capacity of an anode may be decreased compared to the case wherein the cathode additive is not used, thereby inhibiting a decrease in the initial efficiency of a cathode and gas generation in a battery.

In the total amount (100 wt %) of the cathode mixture of one embodiment, the cathode additive may be used in the content of 1 to 30 wt %, specifically 1 to 10 wt %, or more specifically 3 to 10 wt %. Further, the weight ratio of the cathode additive and the cathode active material may be 1:99 to 30:70, specifically 2:98 to 25:85, and more specifically 5:95 to 10:90. When the cathode additive is mixed in the above range, the initial irreversible capacity of an anode may be sufficiently decreased during the initial charge/discharge of a battery (i.e., during the $1^{st}$ cycle), and then reversible intercalation and deintercalation of lithium ions may be stably achieved by the cathode active material during a subsequent charge/discharge (i.e., the $2^{nd}$ and higher cycles).

In addition, the cathode mixture of one embodiment may be realized according to the particulars commonly known in the art. Hereinafter, although particulars commonly known in the art will be briefly presented, these are no more than examples, and the cathode mixture of one embodiment is not limited thereby.

The cathode active material is not specifically limited as long as it is material capable of reversible intercalation and deintercalation of lithium ions. For example, it may include one or more composite oxides of: a metal of cobalt, manganese, nickel, or a combination thereof; and lithium.

More specifically, as the cathode active material, a compound represented by any one of the following chemical formulas may be used: $Li_aA_{1-b}R_bD_2$ (wherein $0.90 \le a \le 1.8$ and $0 \le b \le 0.5$); $Li_aE_{1-b}R_bO_{2-c}D_c$ (wherein $0.90 \le a \le 1.8$, $0 \le b \le 0.5$, and $0 \le c \le 0.05$); $LiE_{2-b}R_bO_{4-c}D_c$ (wherein $0 \le b \le 0.5$ and $0 \le c \le 0.05$); $Li_aNi_{1-b-c}Co_bR_cD_\alpha$ (wherein $0.90 \le a \le 1.8$, $0 \le b \le 0.5$, $0 \le c \le 0.05$, and $0 < \alpha \le 2$); $Li_aNi_{1-b-c}Co_bR_cO_{2-\alpha}Z_\alpha$ (wherein $0.90 \le a \le 1.8$, $0 \le b \le 0.5$, $0 \le c \le 0.05$, and $0 < \alpha < 2$); $Li_aNi_{1-b-c}Co_bR_cO_{2-\alpha}Z_2$ (wherein $0.90 \le a \le 1.8$, $0 \le b \le 0.5$, $0 \le c \le 0.05$, and $0 < \alpha < 2$); $Li_aNi_{1-b-c}Mn_bR_cD_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bR_cO_{2-\alpha}Z_\alpha$ (wherein $0.90 \le a \le 1.8$, $0 \le b \le 0.5$, $0 \le c \le 0.05$, and $0 < \alpha < 2$); $Li_aNi_{1-b-c}Mn_bR_cO_{2-\alpha}Z_2$ (wherein $0.90 \le a \le 1.8$, $0 \le b \le 0.5$, $0 \le c \le 0.05$, and $0 < \alpha < 2$); $Li_aNi_bE_cG_dO_2$ (wherein $0.90 \le a \le 1.8$, $0 \le b \le 0.9$, $0 \le c \le 0.5$, and $0.001 \le d \le 0.1$.); $Li_aNi_bCo_cMn_dGeO_2$ (wherein $0.90 \le a \le 1.8$, $0 \le b \le 0.9$, $0 \le c \le 0.5$, $0 \le d \le 0.5$, and $0.001 \le e \le 0.1$.); $Li_aNiG_bO_2$ (wherein $0.90 \le a \le 1.8$ and $0.001 \le b \le 0.1$.); $Li_aCoG_bO_2$ (wherein $0.90 \le a \le 1.8$ and $0.001 \le b \le 0.1$.); $Li_aMnG_bO_2$ (wherein $0.90 \le a \le 1.8$ and $0.001 \le b \le 0.1$.); $Li_aMn_2GbO_4$ (wherein $0.90 \le a \le 1.8$ and $0.001 \le b \le 0.1$.); $QO_2$; $QS_2$; $LiQS_2$; $V_2O_5$; $LiV_2O_5$; $LiTO_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $FePO_4$.

In the chemical formulas, A is Ni, Co, Mn, or a combination thereof; R is Al, Ni, Co, Mn, Cr, Fe, Mg, Sr, V, a rare earth atom, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The compound may have a coating layer on the surface, or the compound may be used in combination with a compound having a coating layer. The coating layer may include, as a coating element compound, an oxide or hydroxide of the coating element, an oxyhydroxide of the coating element, an oxycarbonate of the coating element, or a hydroxycarbonate of the coating element. A compound making up the coating layer may be amorphous or crystalline. As the coating element included in the coating layer, Mg, Al, Co, K, Na, Ca, Si, Ti, V, Sn, Ge, Ga, B, As, Zr, or a mixture thereof may be used. As the process of forming the coating layer, any coating method may be used as long as these elements can be coated on the compound without adversely influencing the properties of the cathode active material (for example, spray coating, dipping, etc.), and since this can be easily understood by one or ordinary knowledge in the art, the detailed explanations thereof will be omitted.

The cathode mixture of one embodiment may further include a conductive material, a binder, or a mixture thereof. The conductive material is used to provide conductivity to an electrode, and any materials may be used as long as they are electronically conductive material without causing chemical changes, and for example, metal powders or metal fibers such as natural graphite, artificial graphite, carbon black, acetylene black, Ketjen black, carbon fiber, copper, nickel, aluminum, silver, etc. may be used, and one kind or one or more kinds of conductive materials such as polyphenylene derivatives, etc. may be used in combination.

The binder performs the functions for sufficiently attaching the cathode active material particles, and sufficiently attaching the cathode active material to a current collector, and as representative examples, polyvinyl alcohol, carboxymethyl cellulose, hydroxypropyl cellulose, diacetyl cellulose, polyvinyl chloride, carboxylated polyvinyl chloride, polyvinyl fluoride, an ethylene oxide-containing polymer, polyvinyl pyrrolidone, polyurethane, polytetrafluoroethylene, polyvinylidene fluoride, polyethylene polypropylene styrene-butadiene rubber, acrylated styrene-butadiene rubber, an epoxy resin, nylon, etc. may be used, but are not limited thereto.

Lithium Secondary Battery

Yet another embodiment of the present invention provides a lithium secondary battery including a cathode including the above-explained cathode mixture; an electrolyte; and an anode.

Since the lithium secondary battery uses the above-explained cathode additive together with a cathode active material in a cathode, the initial irreversible capacity of an anode may be decreased, the initial efficiency of a cathode may be increased, and a decrease in energy density during the operation may be inhibited, such that an excellent cycle life characteristic may be exhibited.

In the lithium secondary battery of one embodiment, particulars other than the above-explained cathode additive and cathode mixture may be realized according to particulars commonly known in the art.

Hereinafter, although particulars commonly known in the art will be briefly presented, the cathode mixture of one embodiment is not limited thereby.

The cathode may include a cathode current collector, and a cathode mixture layer including the above-explained cathode mixture, positioned on the cathode current collector.

Specifically, the cathode may be prepared by coating an electrode mixture of a cathode active material, a conductive material, and/or a binder on the cathode current collector and then drying, and if necessary, a filler may be further added to the mixture.

The cathode current collector may be generally formed with a thickness of 3~500 µm. Such a cathode current collector is not specifically limited as long as it has high conductivity without inducing chemical changes in a battery. For example, stainless steel, aluminum, nickel, titanium, baked carbon, or aluminum, or stainless steel of which surface is treated with carbon, nickel, titanium, silver, etc., may be used. The collector may have fine unevenness on the surface to increase adhesion of the cathode active material, and it may be in various forms such as a film, a sheet, a foil, a net, a porous body, a foamed body, a non-woven fabric body, etc.

The conductive material is commonly added in the content of 1 to 50 wt %, based on the total weight of the mixture including the cathode active material. Such conductive material is not specifically limited as long as it has conductivity without inducing chemical changes in a battery, and for example, graphite such as natural graphite or artificial graphite; a carbon black such as carbon black, acetylene black, Ketjen black, channel black, furnace black, lamp black, summer black, etc.; a conductive fiber such as a carbon fiber, a metal fiber, etc.; a metal powder such as fluorinated carbon, aluminum, nickel powder, etc.; conductive whiskers such as zinc oxide, potassium titanate, etc.; a conductive metal oxide such as titanium oxide, etc.; or a conductive material such as polyphenylene derivatives, etc. may be used.

Meanwhile, an elastic graphite-based material may be used as the conductive material, and it may be used in combination with the above-described materials.

The binder is a component assisting in the bonding of the active material and the conductive material and the bonding to a current collector, and commonly, it is added in the content of 1 to 50 wt %, based on the total weight of the mixture including cathode active material. Examples of the binder may include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, an ethylene-propylene-diene terpolymer (EPDM), sulfonated EPDM, styrene butylene rubber, fluorine-containing rubber, various copolymers, etc.

The filler is selectively used as a component for inhibiting the expansion of a cathode, and is not specifically limited as long as it is a fibrous material without inducing chemical changes in a battery, and for example, an olefin-based polymer such as polyethylene, polypropylene, etc.; and fibrous materials such as glass fiber, carbon fiber, etc. may be used.

The anode includes a current collector and an anode active material layer formed on the current collector, and the anode active material layer may include an anode active material.

As the anode active material, one or more selected from the group consisting of a carbon-based anode active material, a lithium metal, a lithium alloy, Si, a $SiO_x$ (0<x<2), a Si-Q composite, a Si-Q alloy (wherein Q is an alkali metal, an alkali earth metal, an atom of Group 13 to 16, a transition metal, a rare earth atom, or a combination thereof, provided that it is not Si), Sn, $SnO_2$, a Sn—C composite, and Sn—R (wherein R is an alkali metal, an alkali earth metal, an atom of Groups 13 to 16, a transition metal, a rare earth metal, or a combination thereof, provided that it is not Sn) may be used.

The anode current collector may be generally formed with a thickness of 3~500 µm. Such an anode current collector is not specifically limited as long as it has conductivity without inducing chemical changes in a battery, and for example, copper, stainless steel, aluminum, nickel, titanium, baked carbon, or copper, or stainless steel of which surface is treated with carbon, nickel, titanium, silver, etc., aluminum-cadmium alloy, etc., may be used. Further, like the cathode current collector, fine unevenness may be formed on the surface to increase the bonding force of the anode active material, and it may be in various forms such as a film, a sheet, a foil, a net, a porous body, a foaming body, a non-woven fabric body, etc.

The lithium secondary battery of one embodiment may be a lithium ion battery, a lithium ion polymer battery, or a lithium polymer battery according to the kind of electrolyte and/or the kind of a separator.

When the lithium secondary battery of one embodiment is a lithium ion battery applying a liquid electrolyte, the liquid electrolyte may be impregnated in a separator. The separator is interposed between a cathode and an anode, and a thin insulating film having high ion permeability and mechanical strength may be used therefor. The pore diameter of the separator is generally 0.01~10 µm, and the thickness is generally 5~300 µm. As such a separator, for example, an olefin-based polymer such as a chemical resistant and hydrophobic polypropylene, etc., or a sheet or non-woven fabric, etc. made of glass fiber or polyethylene, etc. may be used. In case a solid electrolyte such as a polymer is used as the electrolyte, the solid electrolyte may also serve as a separator.

The liquid electrolyte may be a lithium salt-containing, non-aqueous electrolyte. The lithium salt-containing, non-aqueous electrolyte is composed of a non-aqueous electrolyte and lithium, and as the non-aqueous electrolyte, non-aqueous organic solvents, organic solid electrolytes, inorganic solid electrolytes, etc. may be used, but is not limited thereto.

As examples of the non-aqueous electrolytic solution, mention may be made of aprotic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2- imidazolidinone, propylene carbonate derivatives, tetrahydrofuran derivatives, ether, methyl propionate, ethyl propionate, etc. may be used.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulfates of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, a lower aliphatic lithium carboxylic acid, lithium tetraphenyl borate, and imide.

Additionally, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the lithium salt-containing non-aqueous electrolyte. According to circumstances, in order to impart incombustibility, the non-aqueous electrolyte may further include halogen-containing solvents, such as carbon tetrachloride and ethylene trifluoride. Furthermore, in order to improve high-temperature storage characteristics, the non-aqueous electrolyte may additionally include carbon dioxide gas, FEC (fluoro-ethylene carbonate), PRS (propene sultone), and the like.

For example, the lithium salt-containing, non-aqueous electrolyte may be prepared by adding a lithium salt such as $LiPF_6$, $LiClO_4$, $LiBF_4$, $LiN(SO_2CF_3)_2$, etc. to a mixed solvent of a solvent having a high dielectric constant such as a cyclic carbonate of EC or PC and a solvent having a low viscosity such as DEC, DMC, or EMC.

The lithium secondary battery of one embodiment may be realized as a battery module including the lithium secondary battery as a unit cell, a battery pack including the battery module, and a device including the battery pack as a power.

Specific examples of the device may include an electric vehicle, a hybrid electric vehicle, a plug-in hybrid electric vehicle, or an electric power storage system, but are not limited thereto.

DESCRIPTION OF THE DRAWINGS

FIG. 1 shows the results of XRD (X-Ray Diffraction) analysis by Fe Kα X-ray (X-rα), for the cathode additives of Example 1 and Comparative Example 1.

FIG. 2 shows the ex-situ XRD analysis results for the cathode additives of Example 1 and Comparative Example 1. Specifically, FIG. 2a relates to Example 1, and FIG. 2b relates to Comparative Example 1.

FIG. 3 shows the results of real time analysis of gas pressure during charging of the batteries of Example 1 and Comparative Example 1.

FIG. 4 shows the results of evaluating the initial charge capacities of the batteries of Examples 2 and 3 and Comparative Example 3.

ADVANTAGEOUS EFFECTS

Figure 5:
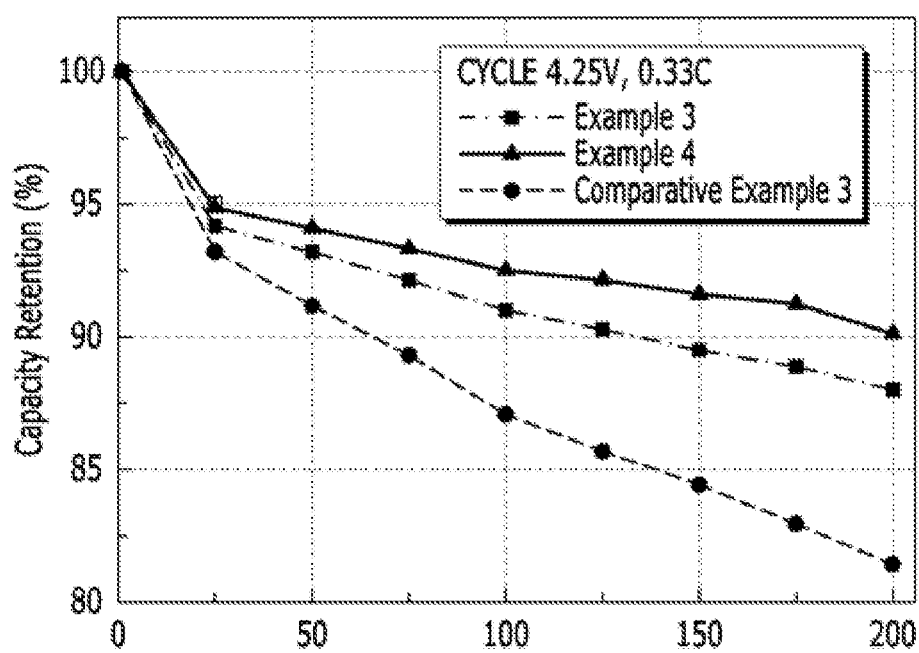
FIG. 5 shows the results of evaluating the cycle life characteristics of the batteries of Examples 2 and 3 and Comparative Example 3.

According to the lithium secondary battery applying the cathode additive of one embodiment for a cathode, the initial irreversible capacity of an anode may be decreased, the initial capacity and efficiency of a cathode may be efficiently increased, and a decrease in energy density during the operation may be inhibited, such that an excellent cycle life characteristic can be exhibited.

DETAILED DESCRIPTION OF CERTAIN EMBODIMENTS

Hereinafter, the actions and effects of the present disclosure will be explained in more detail through specific examples of the present disclosure. However, these examples are presented only as the illustrations of the present disclosure, and the scope of the right of the present disclosure is not limited thereby.

Example 1

A nickel hydroxide precursor, $Ni(OH)_2$ was heat treated under an inert atmosphere at 600° C. for 10 hours to obtain a nickel-based oxide (NiO).

The nickel-based oxide NiO was mixed with lithium oxide ($Li_2O$) at a mole ratio ($NiO:Li_2O$) of 1:1.02, aluminum oxide ($Al_2O_3$) was mixed in the content of 2000 ppm in the total weight of the raw materials, and the mixture was heat treated at 680° C. (inert atmosphere) for 18 hours. At this time, the heating and cooling rates were fixed to 5° C. per minute.

After the heat treatment was finished, $\{_x(Li_2NibAl_{1-b}O_2)\} \cdot \{y(NiO)\} \cdot \{z(Li_2O)\} \cdot \{_wLi_5MO_4\}$, where x=0.83, y=0.07, z=0.07, w=0.03, and b=0.97, was finally obtained, which was designated as a cathode additive of Preparation Example 1.

The above chemical formula was calculated from Experimental Example 1 described below.

Example 2

In order to evaluate the correlation between the cathode additive of Example 1 and the initial properties of a battery (Experimental Example 3), a cathode was prepared using the cathode additive of Example 1, without using the cathode active material, and a lithium secondary battery including the prepared cathode was manufactured.

Specifically, the cathode additive of Example 1 $\{_{0.83}(Li_2Ni_{0.97}Al_{0.03}O_2)\} \cdot \{_{0.07}(NiO)\} \cdot \{_{0.07}(Li_2O)\} \cdot \{_{0.03}Li_5MO_4\}$, a conductive material (Super-P, Denka black), and a binder (PVdF) were mixed in an organic solvent (NMP) at a weight ratio of 85:10:5 (cathode additive:conductive material:binder), to prepare a cathode mixture in the form of a slurry, and then the cathode mixture was coated on an aluminum current collector, and dried in a vacuum oven at 120° C. for 30 minutes to prepare a cathode.

As a counter electrode, Li-metal was used, and as an electrolyte, a solution of 2 wt % of VC dissolved in a mixed solvent of ethylene carbonate (EC) and dimethyl carbonate (DMC) at a volume ratio of 1:2 was used.

A 2032 coin half-cell was manufactured using the above-described constructional elements, according to a common manufacturing method.

Examples 3 and 4

For the practical application form of the cathode additive of Example 1, the cathode additive of Example 1 was used in combination with cathode active material to prepare a cathode, and a lithium secondary battery including the prepared cathode was manufactured.

Specifically, the cathode additive of Example 1 ($\{_{0.83}(Li_2Ni_{0.97}Al_{0.03}O_2)\}\cdot\{_{0.07}(NiO)\}\cdot\{_{0.07}(Li_2O)\}\cdot\{_{0.03}Li_5MO_4\}$), an NCM-based cathode active material ($LiNi_{0.83}Co_{0.11}Mn_{0.06}O_2$), a conductive material (Super-P, Denka Black), and a binder (PVdF) were mixed in an organic solvent (NMP) to prepare a cathode mixture in the form of a slurry, and then the cathode mixture was coated on an aluminum current collector and dried in a vacuum oven at 120° C. for 30 minutes, to manufacture each cathode of Examples 3 and 4.

In Examples 3 and 4, the weight ratios of the cathode additive of Example 1: cathode active material:conductive material:binder were 4.25:80.75:10:5 (Example 3) and 8.5:76.5:10:5 (Example 4), respectively.

Each 2032 coin half-cell was manufactured by the same method as Example 2, using each cathode of Examples 3 and 4 instead of the cathode of Example 2

Comparative Example 1

A nickel hydroxide precursor $Ni(OH)_2$ was heat treated under an inert atmosphere at 600° C. for 10 hours, to obtain a nickel-based oxide (NiO).

The nickel-based oxide (NiO) was mixed with lithium oxide ($Li_2O$) at a mole ratio of 1:1.02 ($NiO:Li_2O$), and the mixture was heat treated under an inert atmosphere at 680° C. for 18 hours. At this time, the speed of heating and cooling was fixed to 5° C. per minute.

After the heat treatment was finished, $\{_x(Li_2Ni_bAl_{1-b}O_2)\}\cdot\{y(NiO)\}\cdot\{z(Li_2O)\}\cdot\{wLi_5MO_4\}$, where x=0.87, y=0.07, z=0.07, w=0, and b=0 was finally obtained, which was determined as a cathode additive of Comparative Example 1.

The above chemical formula was calculated from Experimental Example 1 described below.

Comparative Example 2

In order to evaluate the correlation between the cathode additive of Comparative Example 1 and the initial properties of a battery (Experimental Example 3), a cathode was prepared using the cathode additive of Comparative Example 1, without using a cathode active material, and a lithium secondary battery including the prepared cathode was manufactured.

The preparation methods of the cathode and the lithium secondary battery of Comparative Example 2 were identical to those of Example 2, except that the cathode additive of Comparative Example 1 was used instead of the cathode additive of Example 1.

Comparative Example 3

A cathode was prepared by the same method as Example 2, except that no cathode additive was used, and instead of the cathode additive of Example 1, the same amount of cathode active material was used, and a lithium secondary battery including the prepared cathode was manufactured.

Experimental Example 1: XRD Analysis

For each cathode additive of Example 1 and Comparative Example 1, XRD (X-Ray Diffraction) analysis by Fe Kα X ray (X-rα) was conducted, and the results were show in the following Table 1 and FIG. 1.

Specifically, lithium nickel oxide and the nickel oxide (NiO) can be detected as crystalloids, by XRD (X-Ray Diffraction) by Fe Kα X ray (X-rα).

Particularly, quantitative analysis results were obtained through the calculation of intensity after XRD (X-Ray Diffraction) analysis.

TABLE 1

| | Structural analysis | | | | Quantitative analysis | | |
|---|---|---|---|---|---|---|---|
| | cell parameter (Å) | | | | | | |
| | a axis | c axis | volume (Å$^3$) | crystallite size (nm) | NiO (wt %) | Li$_2$O (wt %) | Li$_5$AlO$_4$ (wt %) |
| Example 1 | 2.779 | 9.025 | 93.98 | 182 | 7 | 7 | 3 |
| Comparative Example 1 | 2.779 | 9.026 | 94.01 | 182 | 7 | 7 | — |

It is already known that Comparative Example 1 has an orthorhombic crystal structure with a point group of 1 mmm. Further, from the results of structural analysis of Table 1, it can be seen that Comparative Example 1 and Example 1 have identical crystal structures. Thus, it can be seen that Example 1 also includes a compound represented by $Li_{2+a}Ni_bAl_{1-b}O_{2+c}$.

Meanwhile, from the analysis results of Table 1, it can be confirmed that $Li_5AlO_4$ was not detected in Comparative Example 1, but $Li_5AlO_4$ was detected in Example 1.

In the lithium nickel oxide having many Li by-products on the surface, particularly LiOH by-products exist in a large quantity. It can be seen that when aluminum oxide ($Al_2O_3$) is doped, it reacts with LiOH on the surface of the cathode additive of Example 1 to form a coating layer of $Li_5AlO_4$ on the surface, and the remaining components are positioned in the core at the lower part of the coating layer.

Experimental Example 2: Ex-Situ XRD Analysis

For each battery of Example 2 and Comparative Example 2, a 0.1C charge was conducted by each voltage to conduct ex-situ XRD analysis, and the results are reported in FIG. 2a (Example 2) and FIG. 2b (Comparative Example 2).

Referring to FIG. 2a (Example 2) and FIG. 2b (Comparative Example 2), it can be confirmed that Comparative Example 2 maintains a $Li_2NiO_2$ structure till 3.9 V on the basis of a 0.1C charge of a coin half-cell, while Example 2 maintains a $Li_2NiO_2$ structure to 4.1V.

Experimental Example 3: Evaluation of the Correlation Between a Cathode Additive and the Initial Properties of a Battery (Evaluation of the Initial Capacity of a Battery and Gas Generation Amount)

For each battery of Example 2 and Comparative Example 2, the 1$^{st}$ charge/discharge was progressed under the following conditions. Further, a gas pressure during the charge of each battery was analyzed in real time using Differential electrochemical mass spectrometer (DEMS), and the amount of gas generation of each battery is recorded in FIG. 3 and the following Table 2.

Charge: 0.1C, CC/CV, 4.25 V, 0.005C cut-off
Discharge: 0.1C, CC, 2.5 V, cut-off

TABLE 2

| 1$^{st}$ Cycle | Anode | | | |
| --- | --- | --- | --- | --- |
| | 0.1 C Charge (mAh/g) | 0.1 C Discharge (mAh/g) | Cathode Efficiency (%) | Gas (μl, 45° C.) |
| Example 2 | 385 | 143.6 | 37.3 | 258.2 |
| Comparative Example 2 | 383 | 142.5 | 37.2 | 376.1 |

According to FIG. 3 and Table 2, it was confirmed that in the battery of Example 2, the initial performance was improved, and gas generation was inhibited, compared to Comparative Example 2. This is considered to result from the application of Al doping and coating in the cathode additive of Example 1.

Meanwhile, in Example 2, the initial performance of a battery and the degree of gas generation may vary according to the content of Li$_2$O in the cathode additive, Al doping amount, and coating amount. As the content of Li$_2$O in the cathode additive increases, the initial performance of a battery is improved, which is the effect resulting from the provision of extra Li by Li$_2$O. Further, as the Al doping amount and coating amount increases in the cathode additive, gas generation of a battery may be inhibited, which is the effect resulting from the stabilization of the crystal structure of the core (particularly, $\{_x(\text{Li}_2\text{Ni}_b\text{Al}_{1-b}\text{O}_2)\}$) by Al doping, and the inhibition of direct contact of the core and electrolyte by Al coating.

In Example 1, in order to confirm the effects of improvement in the initial performance of a battery and inhibition of gas generation by the cathode additive of one embodiment, a cathode mixture was prepared using each cathode additive in the same amount as a common cathode active material, without combining the cathode active material, and a cathode and a lithium secondary battery were manufactured.

As explained above, the cathode additive of one embodiment can irreversibly discharge lithium ions and oxygen at the initial charge voltage, for example, 2.5 to 4.25 V (vs. Li/Li+), and then can be converted into a composition capable of reversible intercalation and deintercalation of lithium ions. Thus, as in Example 1, the core may be utilized as an additive for compensating the initial irreversible capacity of an anode, and also as active material enabling reversible intercalation and deintercalation of lithium.

However, since it may have small reversible capacity compared to a common cathode active material due to the Li content and the structural limitation, in case the initial performance of a battery is to be improved simultaneously while securing a long-time life cycle characteristic, the cathode additive of one embodiment may be combined with a cathode active material at an appropriate mixing ratio according to the aimed properties of a battery.

Hereinafter, Examples 3 and 4 wherein the active cathode material is combined with the cathode additive of one embodiment are presented, and the battery properties will be evaluated.

Experimental Example 4: Evaluation of the Practical Application form of Cathode Additive (Evaluation of the Initial Capacity and Cycle Life Characteristic of a Battery)

Specifically, in comparison with the case wherein only the cathode active material is applied for a cathode (Comparative Example 3), the cathode additive of Example 1 and the cathode active material were applied for a cathode at a weight ratio of 5:95 (Example 3) and 10:90 (Example 4), respectively, and the initial capacity and life cycle characteristics of the batteries were evaluated, and the results were shown in FIG. 3, FIG. 4, and the following Table 3.

TABLE 3

Comparison of the initial charge capacity/retention for Comparative Example 3, Examples 3 and 4

| | | Comparative Example 3 [NCM 100% (Ref.)] | Example 3 [additive: NCM = 5:95 (w; w)] | Example 4 [additive: NCM = 10:90 (w; w)] |
| --- | --- | --- | --- | --- |
| Charge (0.2 C) | mAh/g | 230.0 | 240.5 | 248.8 |
| Discharge (0.2 C) | mAh/g | 216.3 | 213.8 | 210.8 |
| Efficiency | % | 94.0 | 88.9 | 84.7 |
| Capacity Retention (@ 30$^{th}$ cycle) | % | 92.0 | 93.1 | 94.2 |
| Capacity Retention (@ 100$^{th}$ cycle) | % | 87.0 | 91.0 | 92.5 |
| Capacity Retention (@ 200$^{th}$ cycle) | % | 81.4 | 88.0 | 90.1 |

According to FIG. 3, FIG. 4, and Table 3, it is confirmed that in case the cathode additive of one embodiment and the cathode active material are used in combination (Examples 3 and 4), compared to the case of using only the cathode active material for a cathode (Comparative Example 3), both the initial charge capacity and the life cycle characteristic of a battery are improved.

Specifically, according to FIG. 3 and Table 3, it can be confirmed that although the initial charge capacity of Comparative Example 3 is just 230.0 mAh/g, the initial charge capacities of Examples 3 and 4 increased by 10 mAh/g or more. Thus, it can be confirmed that the cathode additive of one embodiment can irreversibly discharge lithium ions and oxygen at the initial charge voltage of a battery, thereby compensating the initial irreversible capacity of an anode, and increasing the initial charge capacity of a cathode.

Moreover, according to FIG. 4 and Table 3, it can be confirmed that when the cycle number of batteries is identical, the capacity retention rates of Examples 3 and 4 are remarkably high, compared to the capacity retention rate of Comparative Example 3.

Such a difference in the capacity retention rates becomes severe as the cycle number of a battery increases, and particularly, it is confirmed that in Comparative Example 3, after operation of 100 cycles, 87.0% of the initial capacity is maintained, and after operation of 200 cycles, 81.4% is maintained. On the other hand, it is confirmed that in the case of Examples 3 and 4, after operation of 100 cycles, 91.0% or more of the initial capacity is maintained, and even after operation of 200 cycles, 88.0% or more of the initial capacity is maintained.

This means that in case battery cycles are progressed while the initial capacity of a cathode increases by the cathode additive of one embodiment, the capacity loss decreases. This also means that after the cathode additive of one embodiment irreversibly discharges lithium ions and oxygen at the initial charge voltage of a battery, it is converted into a composition capable of reversible intercalation and deintercalation of lithium ions, thus partly contributing to the capacity even during the progression of battery cycles.

Meanwhile, among Examples 3 and 4, in Example 4 wherein a cathode mixture including a higher content of cathode additive of one embodiment is used, the initial charge capacity and the cycle life characteristic of a battery are further improved. This means that as a cathode mixture including a high content of cathode additive of one embodiment is used, the initial charge capacity of a battery is further improved, and thus the life cycle of a battery can be more effectively improved.

However, even if the cathode additive of one embodiment irreversibly discharges lithium ions and oxygen at the initial charge voltage of a battery and then is converted into a composition capable of reversible intercalation and deintercalation of lithium ions, it exhibits low reversible (discharge) capacity due to the Li content and structural limitation, and thus the initial efficiency of Example 4 becomes lower than that of Example 3.

Therefore, as explained above, in case the initial performance of a battery is to be improved simultaneously while securing the long-term life cycle characteristic, the cathode additive of one embodiment may be used in combination with the cathode active material at an appropriate mixing ratio, according to the aimed battery properties.

The invention claimed is:

1. A cathode additive composition represented by the following Chemical Formula 1:

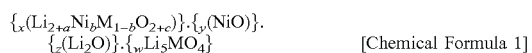 [Chemical Formula 1]

wherein, in Chemical Formula 1,

M is one or more metal atoms forming a divalent cation or a trivalent cation, $-0.2 \le a \le 0.2$, $0.5 \le b \le 1.0$, $-0.2 \le c \le 0.2$, $0.6 \le x \le 1.0$, $0 < y \le 0.15$, $0 < z \le 0.15$, $0 \le w \le 0.1$, $x+y+z+w=1$, provided that when $b=1.0$, $0<w \le 0.1$, and when $w=0$, $0.5 \le b <1.0$, wherein a structure of the cathode additive composition includes a core including the $(Li_{2+a}Ni_bM_{1-b}O_{2+c})$, (NiO) and $(Li_2O)$, and a coating layer including the $Li_5MO_4$.

2. The cathode additive according to claim 1, wherein M includes Al.

3. The cathode additive according to claim 2, wherein a peak by $Li_5AlO_4$ is detected in at least one of a range in which 2θ is 33 to 36°, or a range in which 2θ is 42 to 45°, by XRD (X-Ray Diffraction) measurement by Fe Kα X-ray (X-rα).

4. The cathode additive according to claim 2, wherein the content of $Li_5AlO_4$ in the total amount of the cathode additive (100 wt %) is greater than 0 wt % and equal to or less than 15 wt %.

5. The cathode additive according to claim 1, wherein $y=z$.

6. The cathode additive according to claim 1, wherein a peak by lithium oxide ($Li_2O$) is detected in at least one of a range in which 2θ is 30 to 35°, a range in which 2θ is 35 to 40°, or a range in which 2θ is 55 to 60°, by XRD (X-Ray Diffraction) measurement by Fe Kα X-ray (X-rα).

7. The cathode additive according to claim 1, wherein the content of lithium oxide ($Li_2O$) in the total amount of the cathode additive (100 wt %) is greater than 0 wt % and equal to or less than 15 wt %.

8. The cathode additive according to claim 1, wherein a peak by nickel oxide ($N_tO$) is detected in at least one of a range in which 2θ is 35 to 40°, a range in which 2θ is 40 to 45°, or a range in which 2θ is 50 to 55°, by XRD (X-Ray Diffraction) measurement by Fe Kα X-ray (X-rα).

9. The cathode additive according to claim 1, wherein the content of nickel oxide ($N_tO$) in the total amount of the cathode additive (100 wt %) is greater than 0 wt % and equal to or less than 15 wt %.

10. A cathode mixture comprising:
the cathode additive of claim 1; and
a cathode active material.

11. The cathode mixture according to claim 10, wherein the cathode additive is included in the content in an amount of 1 to 30 wt %, based on the total weight of the mixture (100 wt %).

12. The cathode mixture according to claim 10, wherein the cathode active material includes one or more composite oxides of: a metal of cobalt, manganese, nickel, or a combination thereof; and lithium.

13. The cathode mixture according to claim 10, further comprising a conductive material, a binder, or a mixture thereof.

14. A lithium secondary battery comprising:
a cathode comprising the cathode mixture of claim 10;
an electrolyte; and
an anode.

15. The lithium secondary battery according to claim 14, wherein the anode includes one or more anode active materials selected from the group consisting of a carbon-based anode active material, a lithium metal, a lithium alloy, Si, $SiO_x$ ($0<x<2$), a Si—C composite, a Si-Q alloy (wherein Q is an alkali metal, an alkali earth metal, an atom of Groups 13 to 16, a transition metal, a rare earth atom, or a combination thereof, provided that it is not Si), Sn, $SnO_2$, a Sn—C composite, and Sn—R (R is an alkali metal, an alkali earth metal, an atom of Groups 13 to 16, a transition metal, a rare earth metal, or a combination thereof, provided that it is not Sn).

* * * * *